United States Patent [19]

Petkovsek

[11] 4,401,895

[45] Aug. 30, 1983

[54] SUPPLY FOR PROVIDING UNINTERRUPTIBLE D-C POWER TO A LOAD

[75] Inventor: Dennis W. Petkovsek, Lorain, Ohio

[73] Assignee: Reliance Electric Company, Cleveland, Ohio

[21] Appl. No.: 420,598

[22] Filed: Sep. 20, 1982

[51] Int. Cl.³ ............................................. H02J 7/00
[52] U.S. Cl. ..................................................... 307/66
[58] Field of Search .................... 307/46, 48, 66, 75, 307/82; 363/71

[56] References Cited

U.S. PATENT DOCUMENTS

| 3,339,081 | 8/1967 | Borden et al. | 307/66 |
| 3,573,483 | 4/1971 | White | 307/66 |
| 3,609,386 | 9/1971 | Patlach | 307/66 |
| 4,313,060 | 1/1982 | Fickenscher et al. | 307/82 X |

Primary Examiner—Michael L. Gellner
Assistant Examiner—Derek S. Jennings
Attorney, Agent, or Firm—Michael M. Rickin

[57] ABSTRACT

A system for supplying uninterruptible d-c power to a load. When the system operates in its normal mode, d-c load power is provided by the combination of a rectifier and a power switch. The d-c output of the rectifier may be used by a d-c to d-c down converter to recharge and maintain a battery if a separately powered source is not available for that purpose. A d-c to d-c up converter provides a relatively high amplitude d-c voltage from the battery voltage. The amplitude of this voltage is lower than the amplitude of the d-c output of the rectifier in the normal mode. When the amplitude of the rectifier output falls below the d-c to d-c up converter output voltage, the system changes to its failure mode and the battery provides d-c power to the load. The operation of the down converter if it is included in the system is inhibited.

14 Claims, 3 Drawing Figures

SUPPLY FOR PROVIDING UNINTERRUPTIBLE D-C POWER TO A LOAD

BACKGROUND OF THE INVENTION

1. Field of the Invention

This invention relates to a d-c uninterruptible power supply (UPS) and more particularly to circuitry which can be used in conjunction with a conventional d-c power supply in order that the combination of the conventional supply and the circuitry forms a d-c UPS.

2. Description of the Prior Art

D-C power supplies are often used to provide one or more substantially regulated d-c voltages of relatively low amplitude(s) to a load such as a microcomputer or microprocessor (mpu). The d-c voltages, derived typically from a-c line voltage, are used to provide power to the various circuits of the load such as the memory of the mpu. Many loads and in particular mpu's require that the d-c voltages be applied on a continuous and uninterruptible basis in order that the load operate properly. Even the momentary loss of d-c power to a load such as an mpu will deleteriously affect the operation thereof. For example, the memory devices of the mpu may store false information that was not there originally. Moreover, when power is restored, the microcomputer could receive erroneous command signals. Hence, it is most desirable that d-c power be constantly supplied to a load such as an mpu so that it will not adversely suffer from a loss of a-c line voltage.

For many loads of the type described above the d-c voltages are provided by a commercially available power supply of the type which has its inputs connected to receive the a-c line voltage. The supply then rectifies the line voltage to provide therefrom and store in a convenient energy storage device, such as a capacitor, a d-c voltage of relatively high amplitude. The supply then includes a power switch in the form of a d-c to d-c converter which converts this relatively high amplitude d-c voltage into the one or more relatively low amplitude d-c voltages to be supplied to the load. In many cases the power supply is designed in a manner such that the d-c to d-c converter receives all of the input signals necessary for its operation from the relatively high d-c voltage generated by the rectifier and not by reason of any separate connection of the converter to the a-c line voltage. It has been found that power supplies of that type may be easily and inexpensively converted into a d-c UPS to thereby provide the desirable uninterrupted d-c voltages to the load by the addition of the circuit of the present invention.

SUMMARY OF THE INVENTION

According to the present invention, there is disclosed circuitry which is adapted for use with a power supply of the type which rectifies an a-c voltage to provide d-c power to a load to thereby form in conjunction with the supply a d-c UPS. The power supply includes a rectifier for generating a d-c signal of relatively large amplitude from the a-c voltage and a power switch which utilizes the d-c signal generated by the rectifier to generate the signal for supplying d-c power to the load.

The circuit includes a source such as a battery which provides a relatively low amplitude d-c voltage. A d-c to d-c up converter generates from the battery voltage a d-c voltage of relatively high amplitude which is less than the amplitude of the d-c voltage generated by the rectifier when the a-c voltage is used to supply d-c power to the load. Also included in the circuit is a coupling means which connects the output of the up converter to the output of the rectifier. The coupling means is nonconductive when the voltage at the rectifier output is greater than the voltage at the up converter output. When the d-c voltage of the rectifier drops in amplitude to be less than the d-c voltage at the output of the up converter, the coupling means conducts and connects the output of the up converter to the power switch to supply the load.

DESCRIPTION OF THE PREFERRED EMBODIMENT

Figure 1:
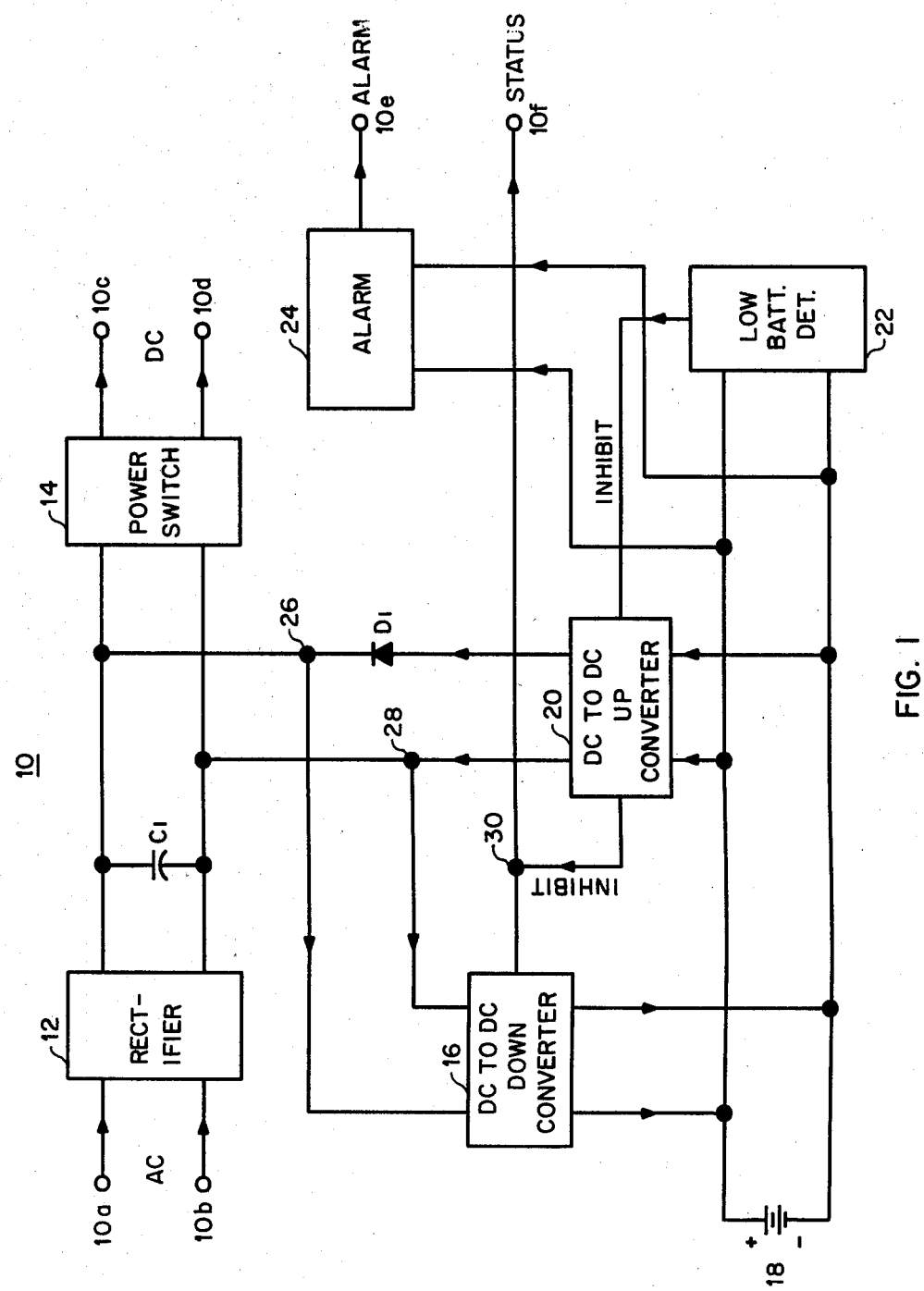
FIG. 1 is a block diagram of the d-c UPS system according to the present invention.

Referring to FIG. 1 there is shown the block diagram of a UPS system 10 which provides uninterruptible d-c power to a load which is connected to the output terminals 10c and 10d of the system. An a-c voltage such as the 60 Hz a-c line voltage available from an electric utility appears at the input terminals 10a and 10b of the system wherein it is converted by rectifier 12 to a relatively high d-c voltage which appears across capacitor C1. This relatively high d-c voltage is converted by power switch 14 to the one or more relatively low d-c voltages utilized by the load. The load, while not shown, may, for example, be an electronic circuit such as an mpu which utilizes d-c voltages in the order of 5 and/or 12 volts for the circuitry included thereon. Power switch 14, which provides from the relatively high d-c voltages present across capacitor C1 the one or more relatively low d-c voltages utilized by the load, is, in effect, a d-c to d-c converter.

It should be appreciated that rectifier 12, capacitor C1 and power switch 14 are conventional in nature and are usually part of a commercially available a-c to d-c power supply which functions in the manner described above. It should also be appreciated that this power supply is of the type wherein power switch 14 receives all of the voltages necessary for it to perform its d-c to d-c conversion function from capacitor C1 and not by reason of any separate connection to the input a-c voltage. In this manner the power supply may be used in conjunction with the circuitry of the present invention as described hereinafter to form a d-c UPS.

To provide uninterruptible d-c power to the load, system 10 also includes the circuitry of the present invention. This circuitry is in the form of d-c to d-c down converter 16, battery 18, d-c to d-c up converter 20 and diode D1 as well as the various detection circuits to be described hereinafter. The relatively high d-c voltage present on capacitor C1 also appears across the junctions designated as 26 and 28 in FIG. 1. As the input of down converter 16 is connected to junctions 26 and 28, the relatively high d-c voltage also appears across the input of that circuit. In response thereto, converter 16 generates a relatively low d-c voltage at its output which is connected to battery 18. Converter 16, therefore, provides current for either recharging battery 18 or keeping the battery floated at the relatively low d-c output voltage of the converter.

It should be appreciated that it is possible to eliminate converter 16 from system 10 and still have a system which provides uninterruptible d-c power to the load. Converter 16 may be eliminated from system 10 if a separate independent source is available for either recharging or floating battery 18. In that case, system 10 would consist at a minimum of rectifier 12, capacitor C1, power switch 14, battery 18 and up converter 20.

D-C to d-c up converter 20 has its input connected across battery 18 and two of its outputs connected directly to junctions 26 and 28. One of the outputs is connected directly to junction 28 while the other of its outputs is connected by a diode D1, poled as shown, to junction 26. In response to the relatively low d-c voltage appearing at its input, converter 20 generates a relatively high and regulated d-c voltage at its output. This voltage, is however, less than the d-c voltage which appears across terminals 26 and 28 when system 10 is using the a-c voltage at its input to supply power to the load.

Converter 20 also includes a third output which is connected at a junction designated as 30 in FIG. 1 to an input of converter 16 which is different from the inputs connected to junctions 26 and 28. As will be described in more detail hereinafter, when the a-c voltage is being used to supply power to the load, converter 20 does not generate a signal at junction 30 and therefore does not inhibit the operation of converter 16. When the battery is being used to supply power to the load, converter 20 generates a signal at junction 30 which appears at the input of converter 16 connected thereto to thereby inhibit the operation of that converter. Junction 30 is also connected to output 10f of system 10 to thereby indicate when the battery is providing power to the load. This is an indication of the system status.

In addition to the converters and battery described above, system 10 further includes a low battery voltage detector circuit 22 and an alarm circuit 24. Detector circuit 22 monitors the voltage of battery 18 and when that voltage falls below some predetermined threshold, it generates a signal to up converter 20 which inhibits the operation of that converter. This action causes the voltage at terminals 10c and 10d to fall to zero. In effect, when the battery voltage falls below the threshold level established by detector circuit 22, it has discharged to a point where it is no longer able to supply power to most of the types of loads connected across terminals 10c and 10d.

Alarm circuit 24 also monitors the voltage of battery 18 and compares it to a predetermined threshold which is set slightly higher than the threshold level contained in circuit 22. When the voltage on the battery has decreased below the threshold of circuit 24, an alarm signal is provided at output 10e of system 10. This signal may be connected to any convenient alarm indicating means such as a light or audible device. As the threshold of circuit 24 is slightly higher than the threshold of circuit 22, the purpose of the alarm is to warn the personnel operating the system that the battery voltage has decreased to a point where, unless other measures are taken, the output voltage at terminals 10c and 10d will fall to zero momentarily. As should be appreciated, the signal appearing at terminal 10e may not only be used to provide an alarm, but may also be used to trigger the operation of an alternative source of energy, such as a motor-generator set, for supplying power to the load or may be used if no such alternative source of energy is available to initiate a controlled shut-down of the load. Such a shut-down may ensure that the contents of the memory are saved if the load is an mpu.

As described above, system 10 provides uninterruptible d-c power to the load. When the a-c voltage present at the input to system 10 exhibits a substantial decrease in amplitude which may occur as a result of a blackout, brownout, interrupt or transient, system 10 operates in what will be referred to hereinafter as its failure mode and the battery is used to provide power to the load. In the absence of a failure of the a-c voltage, system 10 operates in what will be referred to hereinafter as the normal or nonfailure mode and the a-c voltage is used to provide power to the load.

The operation of system 10 in both the normal and failure modes will now be described with respect to FIG. 1. In the normal mode of operation the a-c voltage at inputs 10a and 10b is of sufficient amplitude to provide a d-c voltage across capacitor C1 which is higher than the d-c voltage present at the output of up converter 20. A reverse bias voltage appears across diode D1 and the input voltage to power switch 14 is the voltage across capacitor C1. Down converter 16 uses the voltage across C1 to generate a current to either recharge or float battery 18 dependent on the voltage of the battery. When one of the conditions described above occur in the a-c voltage, the output of rectifier 12 starts to decrease and if the a-c voltage falls below a predetermined level, the voltage across C1 and, therefore, across terminals 26 and 28 decreases to an amplitude where diode D1 becomes forward biased. System 10 then operates in the failure mode.

In the failure mode, converter 20 is then loaded and the battery supplies power to the load through the converter and power switch 14. Converter 20 also generates the signal to inhibit the operation of converter 16. As the purpose of converter 16 is to either float or recharge battery 18 and as the a-c voltage has failed, there is no longer any independent source of energy for operating converter 16. If system 10 remains in the failure mode of operation for some period of time, the voltage on the battery 18 decreases. The voltage at the output of converter 20 is regulated and therefore remains substantially constant even when the voltage on the battery decreases. When the voltage falls below the threshold of circuit 24, an alarm is indicated. If the battery voltage continues to decrease and falls below the threshold of detector circuit 22, the operation of converter 20 and, therefore, system 10 is inhibited.

When the amplitude of the a-c voltage recovers and rises above the predetermined level, the voltage across capacitor C1 becomes large enough to reverse bias diode D1. System 10 then returns to its nonfailure mode of operation. The inhibit signal is removed from converter 16 and that circuit is then able to supply a current to recharge the battery. As is well known in the art, circuit 16 may be designed in a manner so as to limit the amplitude of the charging current when the battery is severely depleted.

In one embodiment of system 10 the voltage at terminals 26 and 28 was in the order of 300 volts d-c when the nominal 117 volt a-c line was supplying the load, whereas the voltage at the output of up converter 20 was in the order of 240 volts d-c when a 24 volt battery was used in the system. Therefore, the a-c line voltage would have to decrease by an amount such that the d-c voltage at terminals 26 and 28 falls to 240 volts before the battery could be used to supply d-c power to the load. Diode D1 has associated with it a forward voltage drop which is typically in the order of 0.6 volts. In actuality, the voltage at terminals 26 and 28 must fall below the voltage at the output of converter 20 by the amount of the forward voltage drop of the diode in order for system 10 to operate in the failure mode. The forward voltage drop across the diodes is, however, quite negligible when compared to the voltage at the output of converter 20 and, therefore, may be ignored.

Figure 2:
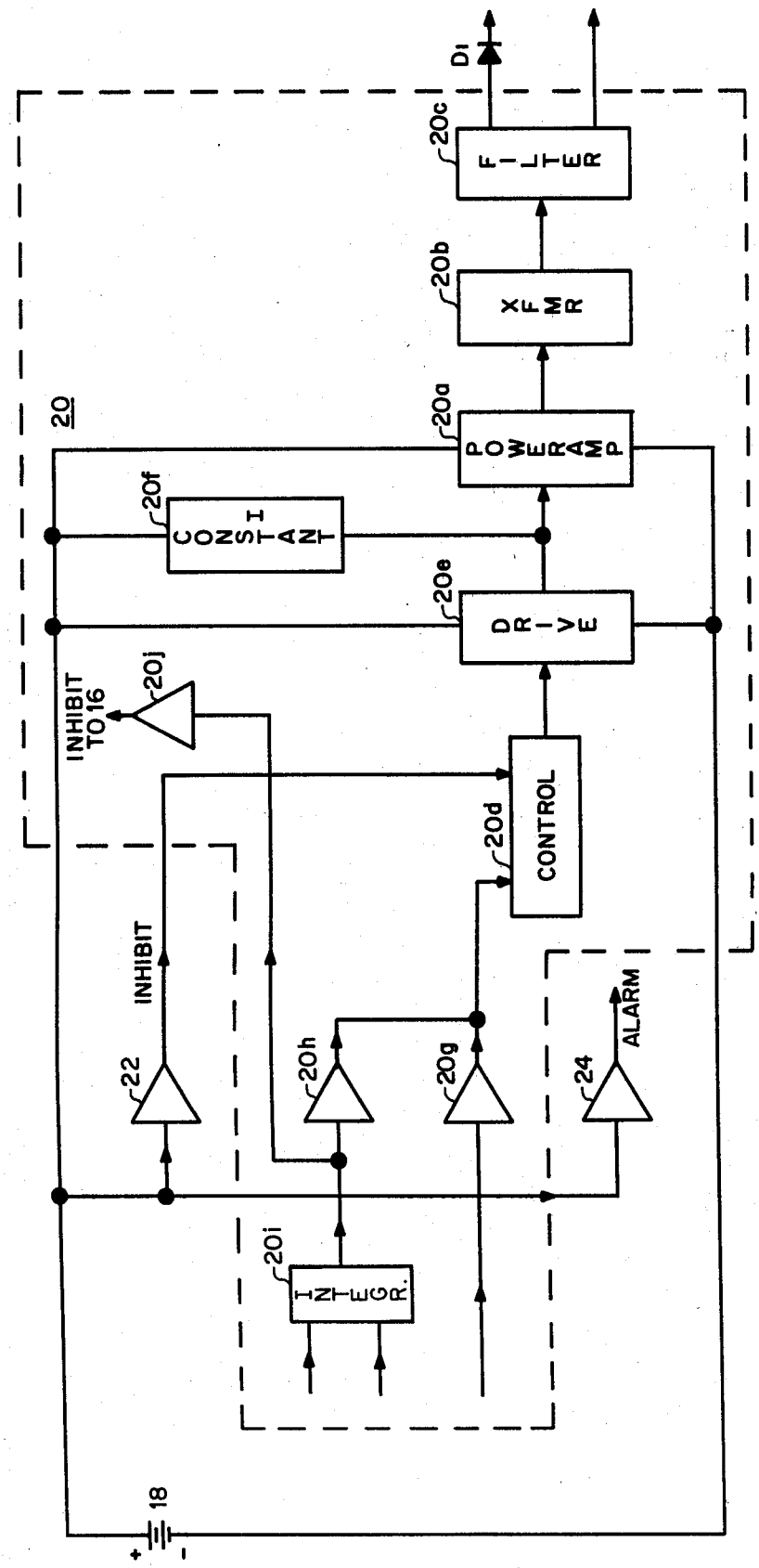
FIG. 2 is a block diagram of the d-c to d-c up converter used in the system of FIG. 1.

Referring to FIG. 2 there is shown the block diagram of a typical d-c to d-c converter which may be used to embody up converter 20. Also shown in FIG. 2 in block form are the comparators which may be used to embody low battery detector circuit 22 and alarm circuit 24. Converter 20 utilizes the well-known pulse width modulation (p.w.m.) technique to drive a power amplifier 20a to thereby convert a d-c voltage into an a-c voltage. The power amplifier is connected to a transformer 20b which serves to isolate the d-c input of the converter from its d-c output and also provides the needed step-up ratio so that the desired relatively high d-c output voltage may be obtained. The stepped-up a-c voltage on the secondary of the transformer is filtered by circuit 20c to thereby provide the desired relatively high d-c voltage. This voltage is connected to power switch 14 through diode D1.

The p.w.m. technique uses a control circuit 20d to generate the modulated pulse width signal which is used to drive power amplifier 20a. The control circuit may, for example, be embodied by a Motorola type MC 3420 circuit chip. The output of the control circuit is connected to the power amplifier by driver circuit 20e. Source 20f provides the constant current utilized by the power amplifier. The width of the pulses generated by circuit 20d is controlled as a function of either the output voltage of the converter or the current flowing in the power devices comprising the amplifier.

An operational amplifier 20g which functions as a comparator compares a signal representative of the converter output voltage with a predetermined reference. The output voltage representative signal may be provided from the converter output or a winding of the transformer 20b. The output of comparator 20g is connected to the control circuit 20d. In response thereto, circuit 20d varies the width of the p.w.m. pulses to provide a regulated voltage at the converter output.

An operational amplifier 20h functioning as an analog comparator compares a signal representative of the current flowing in the power devices of amplifier 20a with a predetermined reference. The signal representative of the current is provided by a suitably arranged current sensing device such as a transformer whose output is connected to the comparator through integrator 20i. The outputs of comparators 20g and 20h are OR'd together to effect control of circuit 20d. Ordinarily, converter 20 operates in the voltage regulating mode and it is the output of comparator 20g which controls the width of the pulses generated by circuit 20d. When excessive current flows through the power devices of amplifier 20a, it is then the output of comparator 20h which controls the width of the pulses generated by circuit 20d.

As described in connection with FIG. 1, system 10 usually operates in its normal mode of operation and power for the load is supplied by the a-c voltage. Converter 20 is, therefore, not delivering power to the load in this normal mode of operation and the current flowing in the power devices of amplifier 20a is at some relatively low or quiescent level. When the system operates in its failure mode, converter 20 will supply the power for the load and, therefore, the current in the power devices will increase above the quiescent level. As the signal at the output of integrator 20i is representative of the current flowing in the power devices, it is this signal which is used by an operational amplifier 20j which functions as a comparator to generate the INHIBIT signal to converter 16. Comparator 20j compares the signal out of integrator 20i to a predetermined reference which is set to be above the quiescent current flowing in the power devices. When the integrator signal exceeds the reference, comparator 20j generates the INHIBIT signal to converter 16.

System 10, as described previously, also monitors the voltage on the battery to determine when that voltage has fallen below some predetermined reference level. This monitoring is performed by low battery detector circuit 22 which, as shown in FIG. 2, may be embodied as an operational amplifier functioning as an analog comparator. When the battery voltage falls below the reference level, detector circuit 22 generates the INHIBIT signal to converter 20 which causes that circuit to turn off. To accomplish that result, the output of circuit 22 is connected to control circuit 20d in a manner such that the INHIBIT signal causes circuit 20d to cease its generation of p.w.m. signals.

System 10 also as described previously monitors the voltage of the battery to provide an ALARM signal when that voltage falls below a reference level which is above the reference level associated with detector circuit 22. This monitoring is performed by alarm circuit 24 which, as shown in FIG. 2, may be embodied as an operational amplifier functioning as a comparator. When the battery voltage falls below the reference level, alarm circuit 24 generates the ALARM signal to system output 10e.

Figure 3:
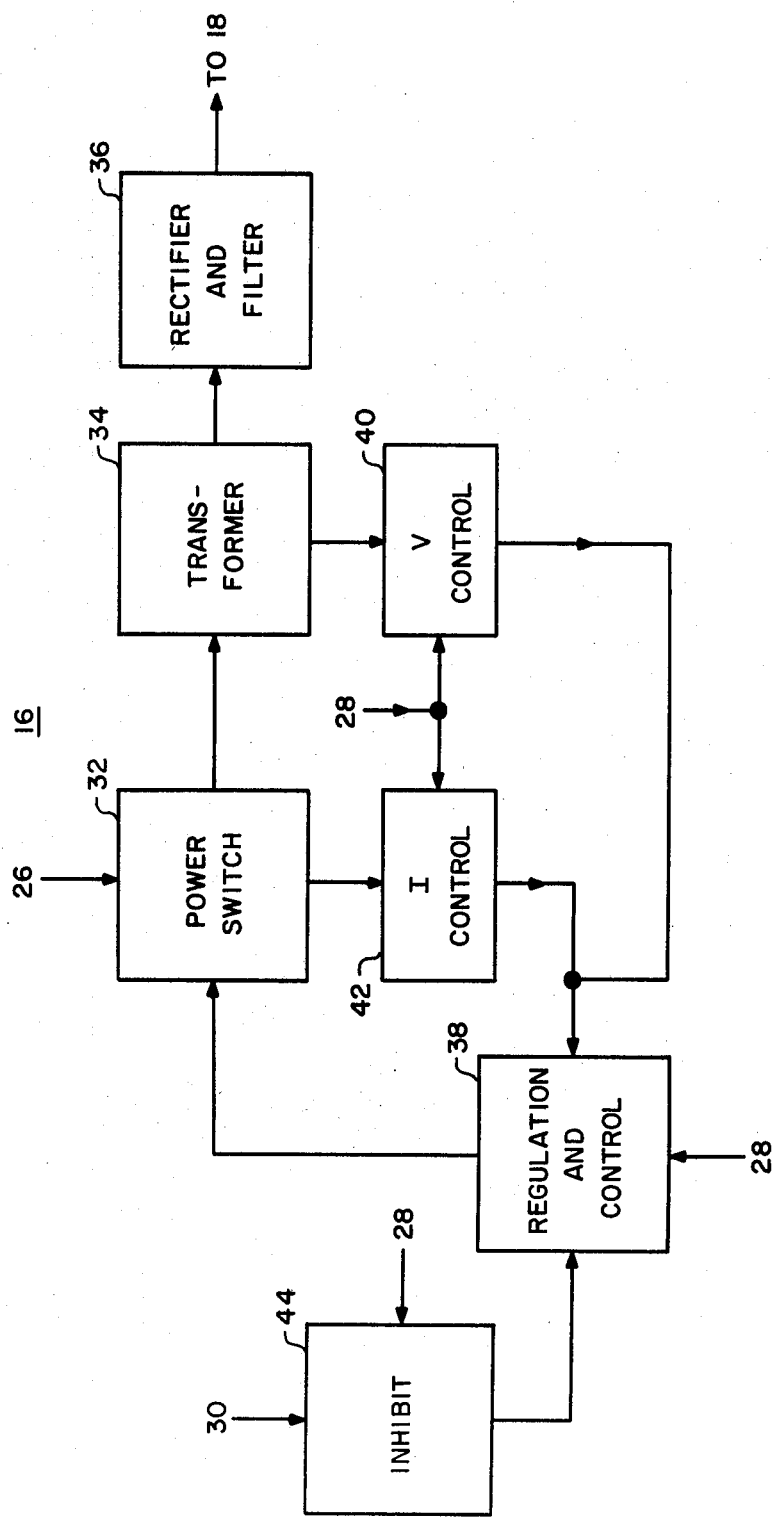
FIG. 3 is a block diagram of the d-c to d-c down converter used in the system of FIG. 1.

D-C to d-c down converter 16 may be embodied in substantially the same form as that shown in FIG. 2 for up converter 20. Converter 16 functions to provide current for either recharging battery 18 or keeping the battery floated at a predetermined d-c voltage when it is fully charged. For that function it is not critical to the operation of converter 16 that it provide at its output a closely regulated d-c voltage. Therefore, it may be desirable to embody converter 16 in a form which accomplishes that function but does not use the relatively expensive p.w.m. circuitry of up converter 20. One such embodiment for a relatively inexpensive down converter 16 which uses the well-known flyback technique is shown in block diagram form in FIG. 3.

Converter 16 includes power switch 32 which may be embodied by a suitably selected switching transistor whose base is connected by a resistor to terminal 26. The collector of the transistor is then connected to one end of a winding of transformer 34, the other end of that winding being connected to terminal 26. When the power switch conducts, energy is stored in the primary inductance of the transformer. When the power switch is nonconductive, the stored energy is then transferred to the transformer secondary where it is rectified and filtered by circuit 36 to thereby provide a d-c voltage and current to battery 18.

The time for which power switch 32 conducts may be controlled either as a function of the output voltage of the converter or as a function of the current flowing in the power switch. When the conduction time of the switch is controlled as a function of the output voltage, converter 16 is said to operate in its voltage controlled mode to thereby provide a substantially regulated voltage at its output. When the conduction time of the switch is controlled as a function of the current flowing in the switch, the converter is said to operate in its current controlled mode to thereby limit that current to some predetermined maximum amplitude. This amplitude is chosen so that the current flowing in switch 32 is limited to a maximum amount which may be safely handled by the transistor used therein.

Converter 16 will ordinarily operate in its voltage controlled mode. When battery 18 has become substantially discharged as a result of its use as a primary source of d-c power in system 10, the current that must be provided to recharge the battery may exceed the predetermined amplitude and converter 16 will switch to its current controlled mode of operation to limit that current to the predetermined amplitude.

Control of the conduction time of power switch 32 is obtained by a signal generated from regulator and control circuit 38. The signal generated by circuit 38 is used to turn off the power switch. Circuit 38 generates the turnoff signal either in response to a signal from voltage control circuit 40 or in response to a signal from current control circuit 42.

Voltage control circuit 40 compares a signal representative of the output voltage of converter 16 to a predetermined reference signal to thereby cause circuit 38 to turn off power switch 32 when the output voltage exceeds a predetermined amplitude. In this manner circuits 38 and 40 function to cause converter 16 to operate in its voltage controlled mode. Current control circuit 42 uses the current flowing in the power switch to cause circuit 38 to turn off the power switch when that current exceeds some predetermined upper amplitude.

Control circuit 38 may be embodied by one or more semiconductor devices which function in total as a silicon controlled rectifier (SCR). The gate of the SCR is connected to receive the signal from either voltage control circuit 40 or current control circuit 42. Upon receipt of either of those signals the SCR is caused to conduct to thereby effect turnoff of power switch 32. Circuit 38 may accomplish turnoff of the switch by including a source of turnoff charge such as a capacitor which is connected across the base-emitter junction of the transistor used to embody switch 32 when the SCR conducts. The source of turnoff charge may be replenished through a suitably arranged charging circuit. One such charging circuit may be embodied by the use of a suitably arranged winding of transformer 34 and the series combination of a resistor and properly poled diode to provide current for recharging the capacitor. Depending on the type of charging circuit and the polarities used therein, recharging may take place either during the on or off time of the power switch.

Finally, converter 16 includes inhibit circuit 44. This circuit responds to the INHIBIT signal which is generated by conveter 20 when system 10 is operating as a UPS to supply power to the system load from the battery to thereby inhibit the operation of converter 16. Circuit 44 may be embodied by a suitably arranged transistor whose base receives the INHIBIT signal. The signal may be connected to the base in any manner well known in the art, such as an optical coupler, which provides the desired isolation between converters 16 and 20. In response to the INHIBIT signal, the transistor conducts. It is connected to power switch 32 in a manner so as to steal base current away from the switch when the INHIBIT transistor conducts. In this manner, power switch 32 can no longer conduct and the operation of converter 16 is inhibited.

While the present invention has been described in connection with a rectifier 12, capacitor C1 and a power switch 14 which are part of a commercially available power supply, it should be appreciated that it is not necessary for those circuits to be part of such a supply in order for system 10 to function as a d-c UPS. In that case, rectifier 12 may be embodied by any of the rectifier circuits well known in the art. Power switch 14, which functions as a d-c to d-c down converter, may then be embodied by a p.w.m. converter of the type described in connection with FIG. 2 which is able to generate one or more substantially regulated low amplitude d-c voltages from a relatively high in amplitude but not necessarily closely regulated d-c voltage at its input.

It is to be understood that the descriptions of the preferred embodiments are intended to be only illustrative, rather than exhaustive, of the present invention. Those of ordinary skill will be able to make certain additions, deletions and/or modifications to the embodiments of the disclosed subject matter without departing from the spirit of the invention or its scope, as defined by the appended claims.

What is claimed is:

1. A circuit adapted for use with a power supply to thereby form in combination therewith a system to provide uninterruptible d-c power to a load said supply being of the type which includes rectifying means responsive to an a-c signal for generating a d-c signal whose relatively large amplitude varies as a function of the amplitude of the a-c signal at the output of said rectifying means and power switching means whose input is directly connected to said rectifying means output to thereby generate from said rectifying means output signal a d-c signal for supplying power to said load when said system operates in a normal mode, said circuit comprising:

(a) source means for providing a relatively low amplitude d-c voltage;

(b) up converter means having an output and responsive to said source means voltage for generating at said output a d-c voltage of relatively high amplitude said amplitude being less than said rectifying means output d-c signal amplitude when said system operates in its normal mode; and (c) coupling means for connecting said up converter means output to said rectifying means output said coupling means being nonconductive when said system operates in said normal mode and becoming conductive when said rectifying means output signal amplitude falls below said up converter means output voltage amplitude whereby said system uses said battery to supply d-c power to said load.

2. The circuit of claim 1 wherein said source means is a battery.

3. The circuit of claim 1 further including down converter means having an input directly connected to said rectifying means output and an output directly connected to said source means said down converter means responsive to said rectifying means output voltage for generating a d-c signal having a relatively low amplitude said signal recharging and maintaining said source means when said supply operates in its normal mode.

4. The circuit of claim 3 wherein said up converter means includes means for generating a signal to inhibit the operation of said down converter means when said system uses said battery to supply d-c power to said load and said down converter means includes means responsive to said signal to inhibit said down converter means operation.

5. The circuit of claim 1 or 3 further including alarm and detection means responsive to said source means d-c voltage amplitude for generating an alarm signal when said amplitude falls to a first predetermined voltage and for generating a signal to said up converter means to inhibit the operation thereof when said amplitude falls to a second and lower predetermined voltage said inhibiting signal turning off said up converter to thereby terminate the supply of d-c power to said load.

6. A circuit adapted for use with a power supply to thereby form in combination therewith a system to provide uninterruptible d-c power to a load said supply being of the type which includes rectifying means responsive to an a-c signal for generating a d-c signal whose relatively large amplitude varies as a function of the amplitude of the a-c signal at the output of said rectifying means and power switching means whose input is directly connected to said rectifying means output to thereby generate from said rectifying means output signal a d-c signal for supplying power to said load when said system operates in a normal mode, said circuit comprising:
(a) source means for providing a relatively low amplitude d-c voltage;
(b) up converter means having an output and responsive to said source means voltage for generating at said output a d-c voltage of relatively high amplitude said amplitude being less than said rectifying means output d-c signal amplitude when said system operates in its normal mode;
(c) alarm and detection means responsive to said source means d-c voltage amplitude for generating an alarm signal when said amplitude falls to a first predetermined voltage and for generating a signal to said up converter means to inhibit the operation thereof when said amplitude falls to a second and lower predetermined voltage said inhibiting signal turning off said up converter to thereby terminate the supply of d-c power to said load; and
(d) coupling means for connecting said up converter means output to said rectifying means output said coupling means being nonconductive when said system operates in said normal mode and becoming conductive when said rectifying means output signal amplitude falls below said up converter means output voltage amplitude whereby said system uses said battery to supply d-c power to said load.

7. The circuit of claim 6 further including down converter means having an input directly connected to said rectifying means output and an output directly connected to said source means said down converter means responsive to said rectifying means output voltage for generating a d-c signal having a relatively low amplitude said signal recharging and maintaining said source means when said supply operates in its normal mode.

8. The circuit of claim 7 wherein said up converter means includes means for generating a signal to inhibit the operation of said down converter means when said system uses said battery to supply d-c power to said load and said down converter means includes means responsive to said signal to inhibit said down converter means operation.

9. A system for providing uninterruptible d-c power to a load comprising:
(a) rectifying means responsive to an a-c signal for generating at its output a d-c voltage having a relatively large amplitude which varies as a function of the amplitude of said a-c signal;
(b) source means for providing a relatively low amplitude d-c voltage;
(c) up converter means having an output and responsive to said source means voltage for generating at said output a d-c voltage of relatively high amplitude;
(d) power switching means having an input directly connected to said rectifying means output and an output connected to said load said switching means responsive to said rectifying means output voltage for providing d-c power to said load from said a-c signal when said rectifying means d-c voltage amplitude exceeds said up converter output voltage amplitude and responsive to said up converter means d-c output voltage for providing power to said load from said battery when said rectifying means d-c voltage falls below said up converter output voltage amplitude; and
(e) coupling means for connecting said up converter means output to said rectifying means output said coupling means being nonconductive when said a-c signal is used to supply power to said load and becoming conductive when said battery is used to provide power to said load.

10. The system of claim 9 wherein said source means is a battery.

11. The system of claim 9 wherein said coupling means is a diode.

12. The system of claim 9 further including down converter means having an input directly connected to said rectifying means output and an output directly connected to said source means said down converter means responsive to said rectifying means output voltage for generating a d-c signal having a relatively low amplitude said signal recharging and maintaining said source means when said a-c signal is used to supply power to said load.

13. The system of claim 12 wherein said up converter means includes means for generating a signal to inhibit the operation of said down converter means when said system uses said battery to supply power to said load and said down converter means includes means responsive to said signal for inhibiting its operation.

14. The system of claim 9 or 12 further including alarm and detection means responsive to said source means d-c voltage amplitude for generating an alarm signal when said amplitude falls to a first predetermined voltage and for generating a signal to said up converter means to inhibit the operation thereof when said amplitude falls to a second and lower predetermined voltage said inhibiting signal turning off said up converter to thereby terminate the supply of d-c power to said load.

* * * * *